Dec. 25, 1934.                F. C. HUSH                1,985,727
                           CLOTHES LINE REEL
                         Filed Dec. 11, 1933
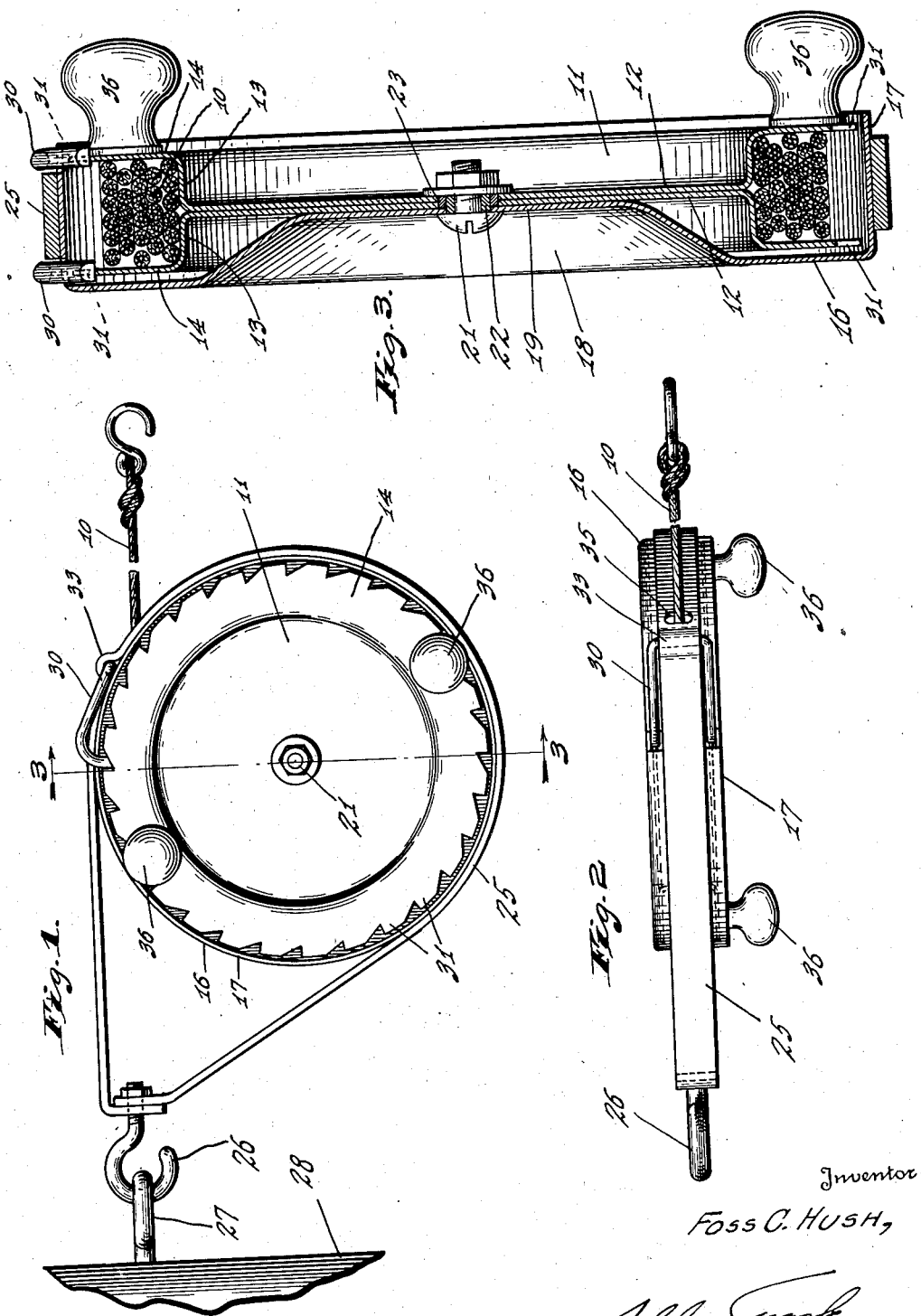
Inventor
Foss C. Hush,
By
Attorneys Patented Dec. 25, 1934

1,985,727

UNITED STATES PATENT OFFICE 1,985,727

CLOTHES-LINE REEL

Foss C. Hush, Lincoln, Nebr.

Application December 11, 1933, Serial No. 701,759

5 Claims. (Cl. 242—101)

It is the object of my invention to produce a clothes-line reel which will be of simple construction and of such a nature that it can be manufactured economically. A further object of my invention is to produce a clothes-line reel so arranged that the forces acting upon the various parts of the reel will be fairly well centered or alined with each other so as to eliminate or reduce the magnitude of stresses which are wholly internal with respect to the reel.

In carrying out my invention I wind the clothes-line on a spool of relatively large diameter and small axial length, and I form the spool with a central web which is pivoted to an enclosing casing in the median plane of the spool. The casing is provided with means for attaching it to a suitable support and also with a ratchet device which engages the spool-end at two points located at equal distances from the median plane of the spool and as close as conveniently possible to the point at which the clothes-line leaves the spool. In addition, the casing is formed to engage the central web of the spool at a distance from the spool axis in order to afford support to the spool against any tendency it may have to cock on its pivot.

The accompanying drawing illustrates my invention: Fig. 1 is a side elevation of the reel in operative position; Fig. 2 is a top plan view of the reel; and Fig. 3 is an enlarged vertical axial section on the line 3—3 of Fig. 1.

In the device illustrated in the drawing, the clothes-line 10 is wrapped upon a spool formed of two generally similar sheet-metal stampings 11. Each of these stampings is circular and is provided with a central circular depression of relatively large diameter. In assembling the spool, the bottoms 12 of these depressions are placed together, so that the side walls 13 of the depressions and the plane peripheral portions 14 of the stampings 11 define a suitable space for the reception of the turns of the clothes-line 10, as is clear from Fig. 3.

The spool formed by the two stampings 11 is mounted in a suitable casing 16. Like the spool-sections 11, the casing 16 is conveniently formed of sheet-metal. It is circular in contour and has at its edge a cylindrical annular flange 17 within which the spool is received. The casing 16 is provided with a central circular depression 18 of a depth approximately equal to half the width of the flange 17.

The bottom 19 of the depression 18 and the central web of the spool formed by the portions 12 of the stampings 11 are provided with alined axial openings for the reception of a pivot bolt 21 associated with which there may be a spacing collar 22 and a bearing-bushing 23. The bolt 21 serves as a pivotal support for the spool in the casing 16 and serves to prevent axial removal of the spool from the casing. The bottom 19 of the depression 18 is plane or otherwise formed to engage the central web of the spool at points remote from the axis thereof, such engagement serving to prevent cocking of the spool on its axis of rotation in the casing.

The casing is adapted for attachment to a support by means of a metal strap 25 which partially surrounds and is secured to the flange 17. The ends of the strap 25 extend toward each other in tangential relation to the flange 17, and the extreme ends of the strap 25 are bent into overlapping relation and provided with holes for the reception of the shank of a hook 26. The hook 26 is adapted for co-operative engagement with an eye 27 secured to any convenient support 28.

Near the top of the casing 16 I mount a pawl 30 which is adapted to co-operate with two series of ratchet teeth 31 formed respectively on the two end flanges 14 of the spool. The pawl 30 is conveniently formed of a single piece of circular rod bent into a U-shape, the central leg of the U being adapted for pivotal attachment to the casing 16 and the two parallel legs having their extreme end portions bent inwardly to extend through openings in the flange 17 into engagement with the ratchet teeth 31.

To provide for the pivotal mounting of the pawl 30, the strap 25 has an outwardly deformed portion 33 which embraces the intermediate leg of the U-shaped pawl 30 and in which the pawl is held by the flange 17.

The clothes-line 10 emerges from the casing through a suitable opening 35 provided in the casing-flange 17 and in the strap 25. The opening 35 is so disposed that a line passing through it and the hook 26 will extend generally tangentially through the groove portion of the spool occupied by the wound clothes-line. Thus, when the clothes-line is extended it will not tend to bear heavily against the sides of the opening 35.

For the purpose of rotating the spool to wind up the clothes-line and to tighten the clothes-line when it is in position, I provide on the outer end flange 14 of the spool two diametrically opposite knobs 36. By using his two hands to apply equal and oppositely directed forces to the knobs 36, the operator can avoid imposing transverse forces on the stressed clothes-line as the line is tightened.

The ends of the pawl 30 engage the flanges 14 of the spool at points located as close as convenient to the point of tangency of the clothes-line 10, thus minimizing the magnitude of the reaction between the spool and the pivot bolt 21 in the plane of the reel. Further, by employing the double pawl which engages both of the flanges 14, any effect of the tension in the line 10 tending to cock the spool out of its normal plane is transmitted directly to the casing through the pawls and is not transferred in any substantial magnitude through the pivot bolt 21. This feature, together with the support which the web 12 of the spool receives from the bottom 19 of the depression 18, makes possible the use of the short pivot bolt and the resultant simplification of construction.

I claim as my invention:

1. A reel, comprising a spool of relatively large diameter and short axial length, said spool having a central web located substantially in the median transverse plane of the spool, a sheet-metal casing having a peripheral flange surrounding said spool and an axially displaced central portion engaging said web, a pivot bolt pivotally interconnecting the central portion of the casing and the web of the spool, a strap partially encircling and secured to said flange and adapted for attachment to a support, said flange and strap having alined openings through which a clothes-line encircling said spool may emerge from the casing, said strap having a portion spaced from said flange, and a pawl having a part pivotally supported between said flange and the strap-portion displaced therefrom, said spool being provided at both its axial ends with an annular series of ratchet teeth and said pawl having tooth-engaging portions co-operating respectively with said two series of ratchet teeth.

2. A reel, comprising a spool of relatively large diameter and short axial length, said spool having a central web located substantially in the median transverse plane of the spool, a sheet-metal casing having a peripheral flange surrounding said spool and an axially displaced central portion engaging said web, a pivot bolt pivotally interconnecting the central portion of the casing and the web of the spool, a strap partially encircling and secured to said flange and adapted for attachment to a support, said flange and strap having alined openings through which a clothes-line encircling said spool may emerge from the casing, said strap having a portion spaced from said flange, and a pawl having a part pivotally supported between said flange and the strap-portion displaced therefrom, said spool being provided with an annular series of ratchet teeth with which said pawl cooperates.

3. A reel, comprising a spool having a peripheral clothes-line receiving groove defined by annular flanges at the ends of the spool, a casing within which said spool is rotatably mounted, means for loosely attaching said casing to a support, said casing having an open side exposing one end of said spool, and two diametrically opposite winding-knobs secured to the spool-flange and extending axially outwardly of the spool in the open side of said casing.

4. In a clothes-line reel, a spool of relatively large diameter and short axial length, said spool having a central web located substantially in the median transverse plane of the spool, a sheet-metal casing having a peripheral flange surrounding said spool and an axially depressed center portion engaging said web, and a pivot bolt pivotally inter-connecting the central portion of the casing and the web of the spool.

5. In a clothes-line reel, a spool of relatively large diameter and short axial length, said spool having an annular clothes-line receiving groove the sides of which are defined by end flanges on the spool, one face of said spool having a central recess of a depth approximately equal to half the distance between said end flanges, a sheet-metal casing having a peripheral flange surrounding said spool and a centrally located projection extending into said recess into engagement with the bottom thereof, and a centrally located pivot bolt interconnecting said spool and casing.

FOSS C. HUSH.